(12) United States Patent
Kusuda

(10) Patent No.: US 10,071,428 B2
(45) Date of Patent: Sep. 11, 2018

(54) HOLDER, CUTTING TOOL, AND METHOD OF PRODUCING MACHINED PRODUCT

(71) Applicant: KYOCERA Corporation, Kyoto-shi, Kyoto (JP)

(72) Inventor: Yukihiro Kusuda, Yasu (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 0 days.

(21) Appl. No.: 15/520,924

(22) PCT Filed: Oct. 27, 2015

(86) PCT No.: PCT/JP2015/080211
§ 371 (c)(1),
(2) Date: Apr. 21, 2017

(87) PCT Pub. No.: WO2016/068120
PCT Pub. Date: May 6, 2016

(65) Prior Publication Data
US 2017/0333997 A1 Nov. 23, 2017

(30) Foreign Application Priority Data
Oct. 29, 2014 (JP) .................................. 2014-220171

(51) Int. Cl.
*B23B 27/00* (2006.01)
*B23B 27/04* (2006.01)
(Continued)

(52) U.S. Cl.
CPC .......... *B23B 27/04* (2013.01); *B23B 27/1611* (2013.01); *B23B 29/025* (2013.01);
(Continued)

(58) Field of Classification Search
CPC . B23B 27/04; B23B 27/1611; B23B 27/1666; B23B 29/04; B23B 29/02; B23B 29/043; B23B 2205/12
See application file for complete search history.

(56) References Cited

U.S. PATENT DOCUMENTS 5,159,863 A * 11/1992 Simpson, III ........... B23B 27/04
407/101
5,829,923 A * 11/1998 Nowicki ............... B23B 27/007
407/101
(Continued)

FOREIGN PATENT DOCUMENTS

JP 2006-263845 A 10/2006
JP 2010-179380 A 8/2010
WO 2009/157540 A1 12/2009

*Primary Examiner* — Will Fridie, Jr.
(74) *Attorney, Agent, or Firm* — Volpe and Koenig, P.C.

(57) ABSTRACT

A holder according to one embodiment has a rod shape and includes a head portion located at a front end side. The head portion includes an upper jaw portion and a lower jaw portion located at a front end, an insert pocket located between the upper jaw portion and the lower jaw portion, a first wall surface located at an upper surface of the upper jaw portion and inclined in an extending manner from one side surface side, a second wall surface located closer to a rear end side than the first wall surface and inclined upward, a concave-shaped third wall surface located closer to the rear end side than the second wall surface, and a fourth wall surface inclined upward as the fourth wall surface extends away from the third wall surface. The third wall surface is concave downward from an upper end of the second wall surface.

10 Claims, 16 Drawing Sheets

(51) Int. Cl.
  *B23B 27/16* (2006.01)
  *B23B 29/02* (2006.01)
  *B23B 29/22* (2006.01)
  *B23B 29/04* (2006.01)

(52) U.S. Cl.
  CPC ............ *B23B 29/22* (2013.01); *B23B 29/046* (2013.01); *B23B 2205/12* (2013.01)

(56) References Cited

U.S. PATENT DOCUMENTS

| | | | | |
|---|---|---|---|---|
| 5,833,403 A * | 11/1998 | Barazani | ............... | B23B 27/007 407/101 |
| 8,342,066 B2 * | 1/2013 | Watanabe | ............. | B23B 27/007 82/1.11 |
| 2009/0087268 A1 * | 4/2009 | Schafer | .................. | B23B 27/04 407/101 |
| 2011/0097167 A1 * | 4/2011 | Inoue | .................... | B23B 27/007 407/102 |
| 2013/0294854 A1 * | 11/2013 | Lee | ......................... | B23B 27/16 407/101 |
| 2014/0234040 A1 * | 8/2014 | Hecht | .................... | B23B 27/04 407/107 |
| 2014/0321926 A1 * | 10/2014 | Sadikov | ................. | B23B 27/10 407/11 |
| 2015/0030400 A1 * | 1/2015 | Tsuda | ................... | B23B 27/045 407/107 |

* cited by examiner

HOLDER, CUTTING TOOL, AND METHOD OF PRODUCING MACHINED PRODUCT

TECHNICAL FIELD

The present embodiment relates to a holder, a cutting tool, and a method of producing a machined product.

BACKGROUND ART

As a cutting tool used for applying cutting working to a workpiece made of metal or the like, there has been known a cutting tool described in WO 2009-157540 (patent document 1), a cutting tool described in JP 2006-263845 A (patent document 2) and a cutting tool described in JP 2010-179380 A (patent document 3). All these cutting tools described in these patent documents 1 to 3 are used in applying working to an inner dimeter of a workpiece having a cylindrical shape. Each cutting tool includes a holder, and a cutting insert (insert) mounted on a front end of the holder. Particularly, both cutting tools described in patent documents 2 and 3 are tools used in applying grooving process.

When a workpiece having a cylindrical shape includes a cylindrical bottom, chips flow toward a rear end side from a front end side of the cutting tool, and are discharged to the outside from an opening portion located at the rear end side of the workpiece having a cylindrical shape.

The larger an outer diameter of the holder, the higher the rigidity of the holder becomes. Accordingly, in applying inner diameter working, considered is the use of a holder which includes a large outer diameter so as to make the outer diameter of the holder set close to an inner diameter of the workpiece as much as possible. However, the larger the outer diameter of the holder becomes, the narrower a space between the holder and the workpiece becomes and hence, the space is liable to be clogged by chips. Particularly, in applying grooving process using the cutting tool described in patent documents 2 and 3, compared to the case where inner diameter working is applied using the cutting tool described in patent document 1, a width of chips easily becomes large and hence, the space is liable to be clogged by the chips.

In the holders of both cutting tools described in patent documents 2 and 3, when compared a first portion of the upper jaw portion which is located above an insert pocket and a second portion of the upper jaw portion which is located closer to a rear end side of the holder than the first portion to each other, an outer periphery of the second portion projects upward or sideward from the first portion. Accordingly, when the outer diameter of the holder is increased, in discharging chips through a space above the upper jaw portion, there is a possibility that a portion of the holder located closer to a rear end side than the upper jaw portion is clogged by the chips.

The present embodiment has been made in view of such drawbacks, and it is an object of the present embodiment to provide a holder which can discharge chips in a stable manner even in applying grooving process.

SUMMARY OF THE INVENTION

A holder according to one embodiment has a rod shape and includes a shank portion located at a rear end side of a central axis, and a head portion located closer to a front end side than the shank portion, a cutting insert including a cutting edge being mounted on the head portion. The head portion includes: an upper jaw portion and a lower jaw portion located at the front end of the head portion and facing each other in an opposed manner; an insert pocket located between the upper jaw portion and the lower jaw portion, the cutting insert being mounted in the insert pocket in such a manner that the cutting edge projects from one side surface side in a direction orthogonal to the central axis; a first wall surface extending toward the other side surface side from an end portion of the one side surface side on an upper surface of the upper jaw portion, the first wall surface inclined upward as the first wall surface extends toward the other side surface side; a second wall surface located closer to the rear end side than the first wall surface and located at the one side surface side, the second wall surface inclined upward as the second wall surface extends toward the rear end side; a concave-shaped third wall surface located closer to the rear end side than the second wall surface; and a fourth wall surface located closer to the rear end side than the third wall surface, the fourth wall surface inclined upward as the fourth wall surface extends away from the third wall surface. The third wall surface is concave downward from an upper end of the second wall surface, and the fourth wall surface is located above the upper end of the second wall surface.

EMBODIMENTS FOR CARRYING OUT THE INVENTION

Figure 1:
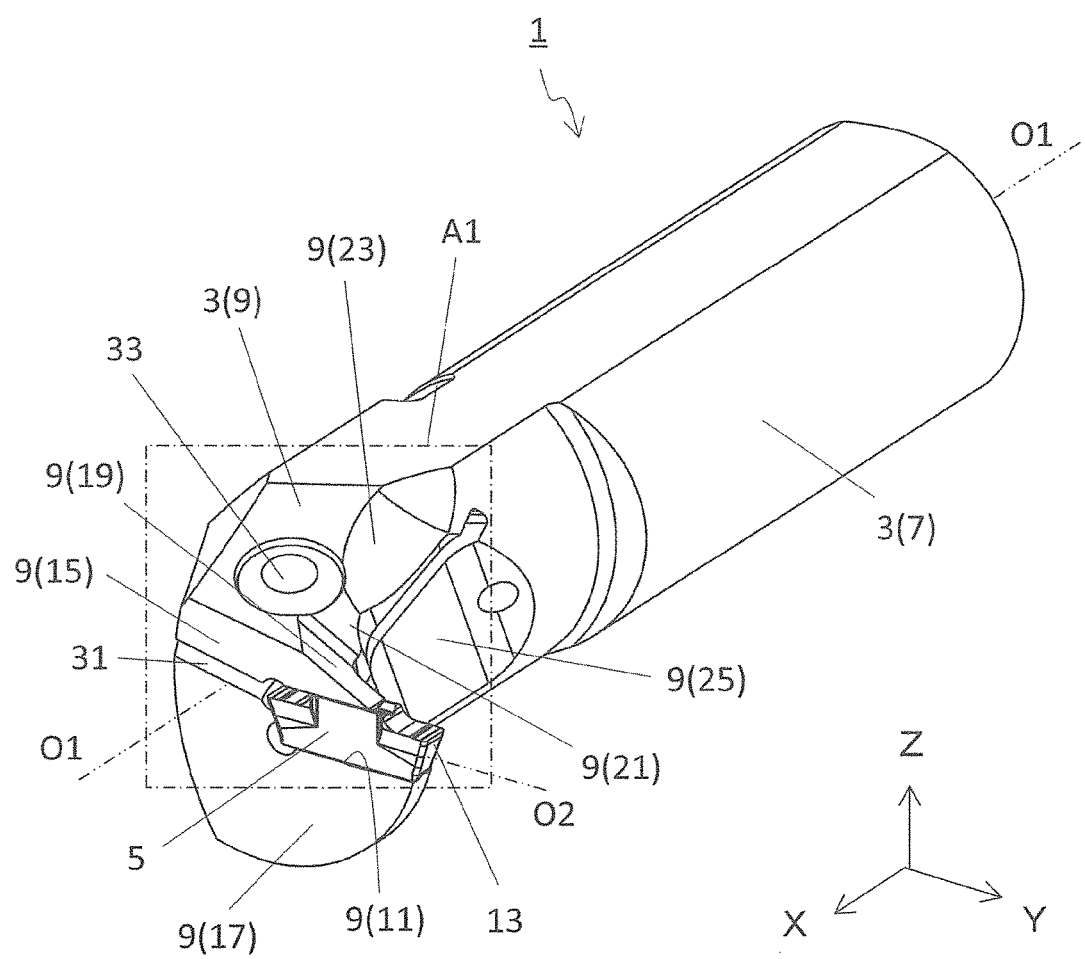
FIG. 1 is a perspective view showing a cutting tool of a first embodiment.

A cutting tool according to an embodiment will be described in detail with reference to accompanying drawings. However, for convenience of explanation, the respective drawings which will be referred to below schematically show only principal elements necessary for describing such an embodiment. Accordingly, a cutting tool according to the present invention can include arbitrary structural elements which are not shown in the drawings referred to in this description. Also, dimensions of elements in the drawings do not exactly represent dimensions of actual structural elements, dimension ratios of the respective elements, and the like.

Figure 2:
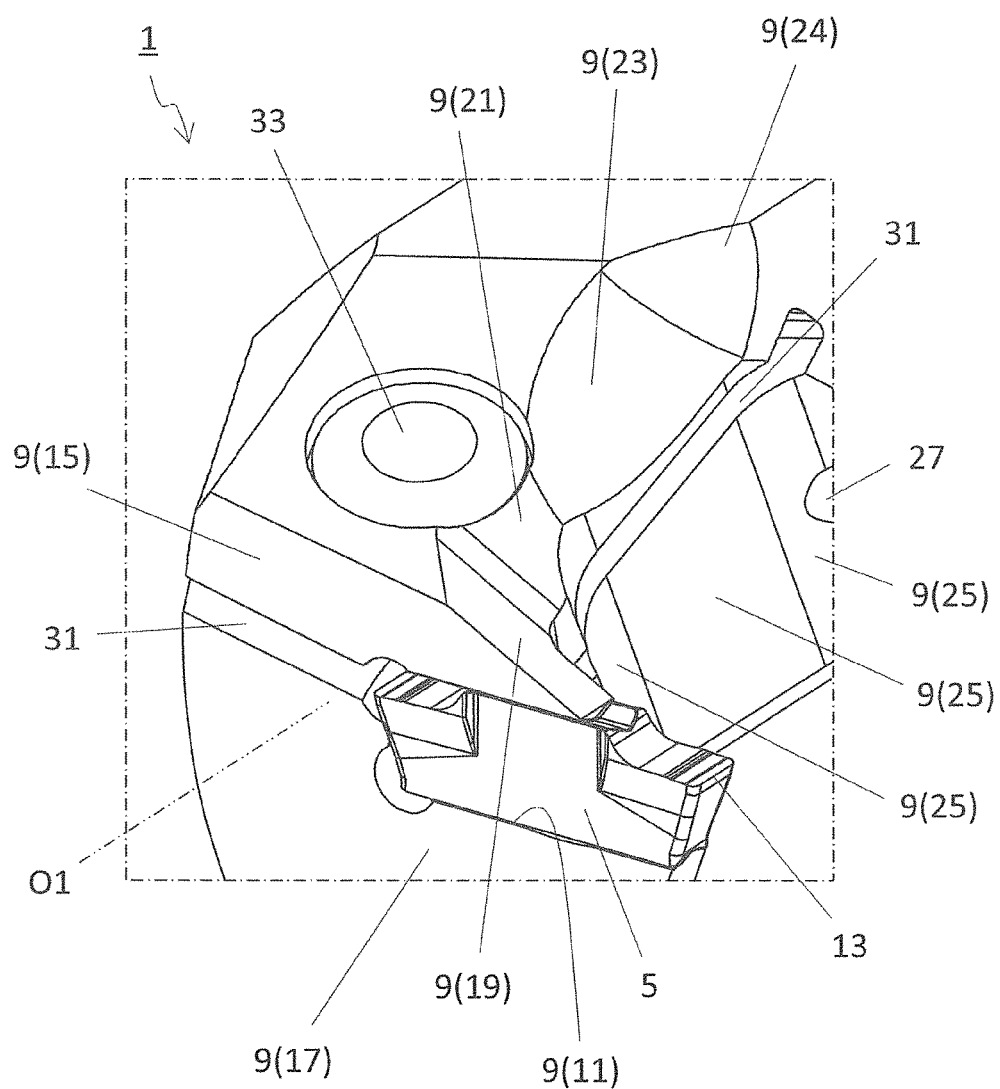
FIG. 2 is a perspective view showing a region A1 of the cutting tool shown in FIG. 1 in an enlarged manner.
Figure 3:
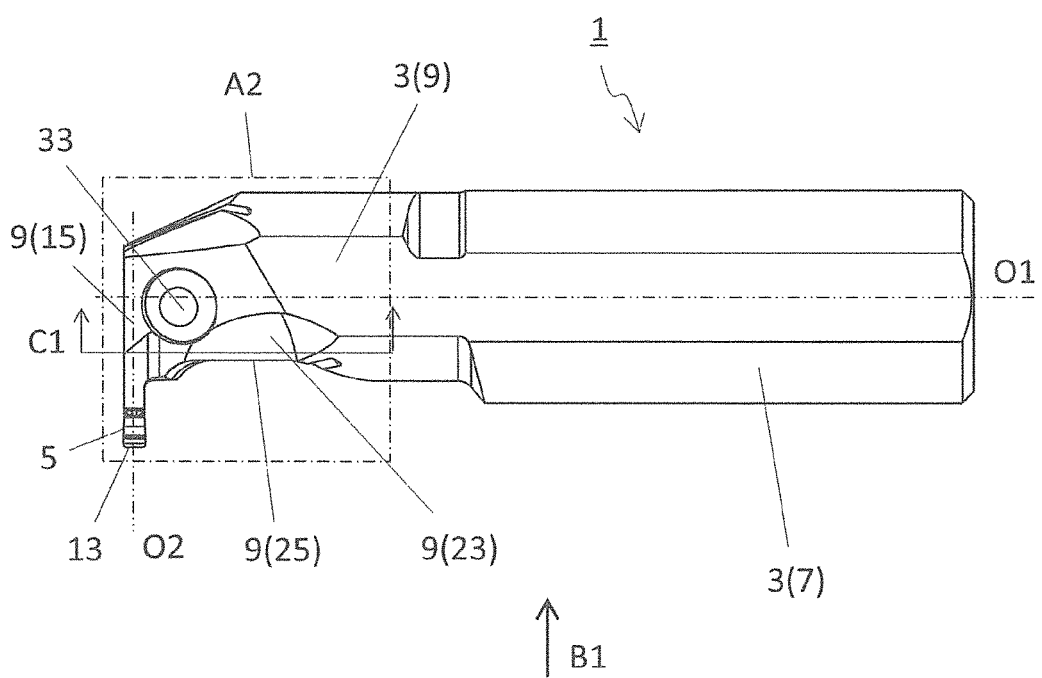
FIG. 3 is a top plan view of the cutting tool shown in FIG. 1.
Figure 4:
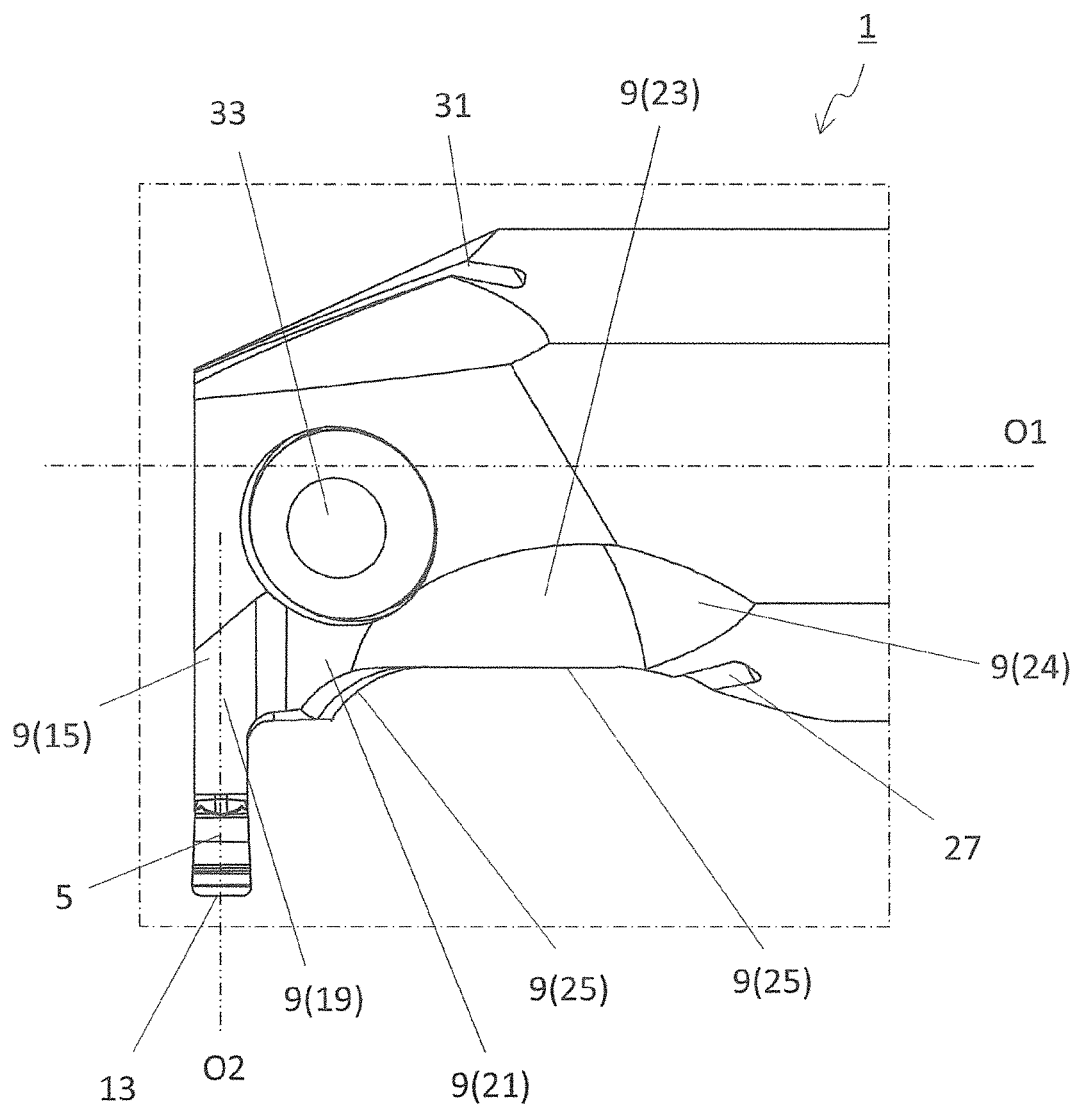
FIG. 4 is a top plan view showing a region A2 of the cutting tool shown in FIG. 3 in an enlarged manner.
Figure 5:
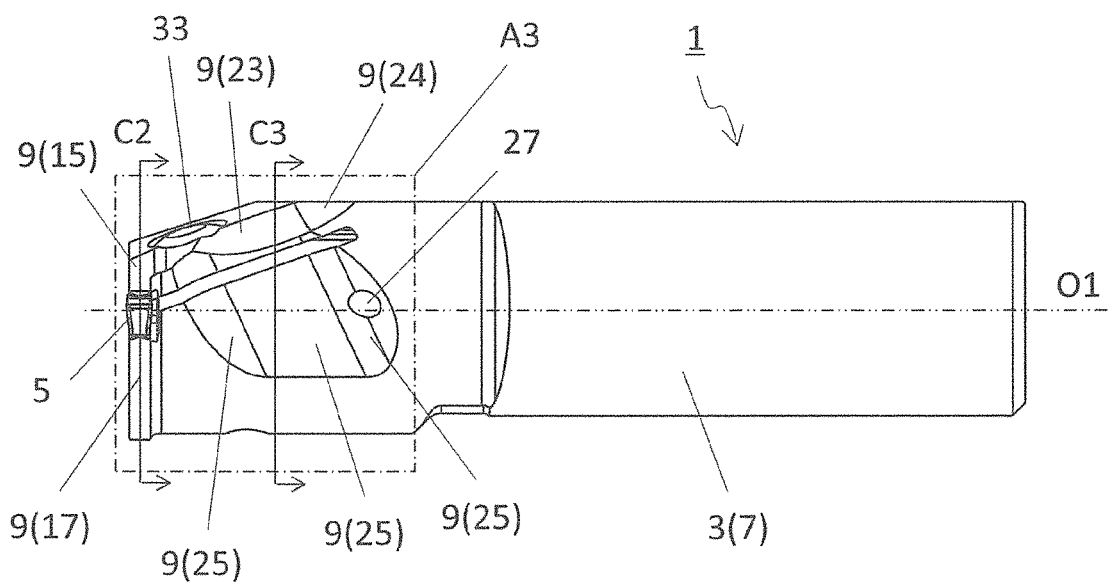
FIG. 5 is a side view of the cutting tool shown in FIG. 3 as viewed from a side in a direction B1.
Figure 6:
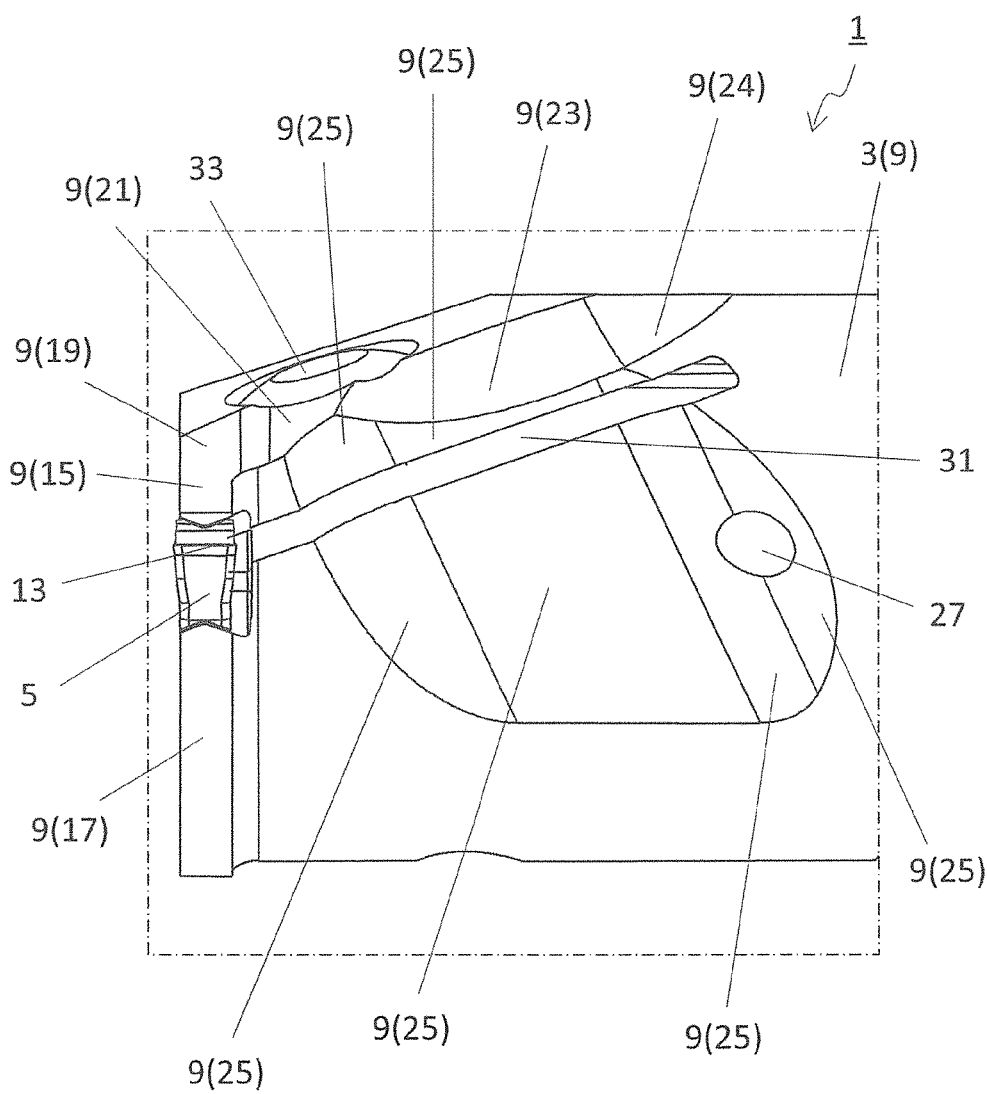
FIG. 6 is a side view showing a region A3 of the cutting tool shown in FIG. 5 in an enlarged manner.

FIG. 1 is a perspective view showing the external appearance of a cutting tool 1 of an embodiment. FIG. 2 is a perspective view showing a region A1 of the cutting tool 1 shown in FIG. 1 in an enlarged manner. FIG. 2 shows a front end portion of the cutting tool 1 in an enlarged manner. FIG. 3 is a top plan view of the cutting tool 1 shown in FIG. 1. In this embodiment, the top plan view means a view as viewed in the direction along which an upper surface of a cutting insert 5 (hereinafter also simply referred to as "insert 5") which the cutting tool 1 includes is viewed. FIG. 4 is a top plan view showing a region A2 of the cutting tool 1 shown in FIG. 3 in an enlarged manner. FIG. 5 is a view of the cutting tool 1 shown in FIG. 1 as viewed from one side surface of the cutting tool 1. FIG. 6 is a side view showing a region A3 of the cutting tool 1 shown in FIG. 5 in an enlarged manner.

The cutting tool 1 of this embodiment includes a holder 3 and the cutting insert 5. The holder 3 has a rod shape which extends along a first central axis O1, and includes a shank portion 7 and a head portion 9. The shank portion 7 is located at a rear end side of the rod-shaped holder 3 which extends along the first central axis O1. The head portion 9 is located closer to a front end side than the shank portion 7 is. The shank portion 7 is a portion which is designed corresponding to a shape of a machine tool (not shown in the drawing). In this embodiment, the shank portion 7 has substantially a rod shape. The head portion 9 is a portion which holds the insert 5, and includes an insert pocket 11 (hereinafter also simply referred to as "pocket 11") in which an insert 5 is mounted.

In FIG. 1 and the like, the first central axis O1 is indicated by a double dashed chain line. In this embodiment, the holder 3 specifically has a substantially circular columnar shape. As a material for forming the holder 3, steel, cast iron or the like may be used. Among these materials, steel which has high toughness is particularly preferably used.

Figure 9:
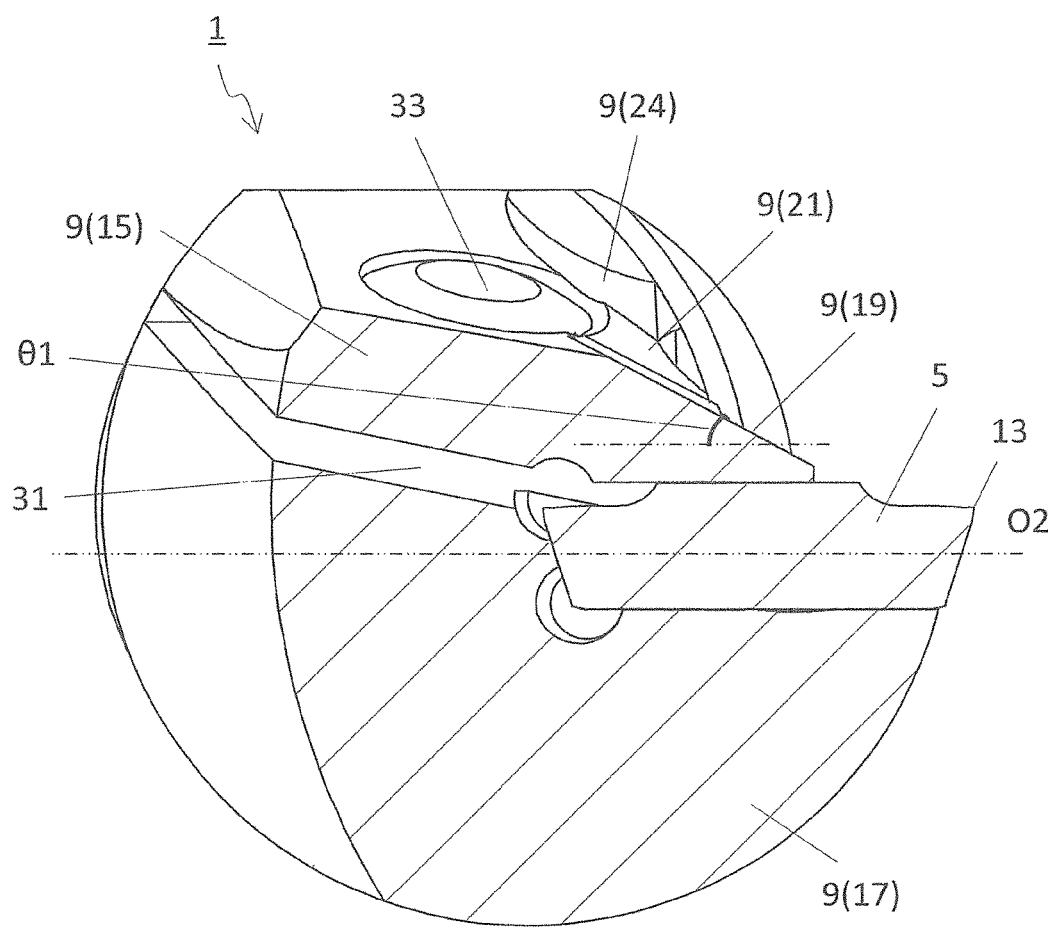
FIG. 9 is a cross-sectional view of the cutting tool shown in FIG. 5 taken along a cross section C2.

The insert 5 has a rod shape. The insert 5 is mounted in the pocket 11 of the holder 3 such that the insert 5 extends along the direction orthogonal to the first central axis O1 of the holder 3. In this embodiment, assume a central axis of the insert 5 which extends along the direction orthogonal to the first central axis O1 as a second central axis O2. In this embodiment, the second central axis O2 extends to the other side surface side from one side surface side of the holder 3. In this embodiment, the insert 5 specifically has substantially a quadrangular columnar shape. Accordingly, when viewed in a side view as shown in FIG. 9, the upper surface and a lower surface of the insert 5 extend along the second central axis O2.

As a material of a member which forms the insert 5, cemented carbide or cermet can be named, for example. As examples of a composition of cemented carbide, for example, WC—Co, WC—TiC—Co and WC—TiC—TaC—Co can be named. WC—Co is produced by adding cobalt (Co) powder to tungsten carbide (WC) powder and by sintering a mixed body. WC—TiC—Co is produced by adding titanium carbide (TiC) to WC—Co. WC—TiC—TaC—Co is produced by adding tantalum carbide (TaC) to WC—TiC—Co.

Cermet is a sintered composite material composed of a ceramic component and metal. To be more specific, as the cermet, a sintered composite material which contains a titanium compound such as titanium carbide (TiC) or titanium nitride (TiN) as a main component can be named.

A surface of the member which forms the insert 5 may be coated with a film formed by chemical vapor deposition (CVD) method or a physical vapor deposition (PVD) method. As examples of a composition of the film, titanium carbide (TiC), titanium nitride (TiN), titanium carbonitride (TiCN), and alumina ($Al_2O_3$) can be named.

The cutting insert 5 includes a cutting edge 13 at a rod-shaped end portion thereof. The cutting edge 13 extends in the direction substantially orthogonal to the second central axis O2 and, extends in the direction substantially along the first central axis O1 in a state where the cutting insert 5 is mounted on the holder 3. The insert 5 is mounted on the holder 3 in such a manner that the cutting edge 13 projects outward from one side surface side of the holder 3.

Figure 10:
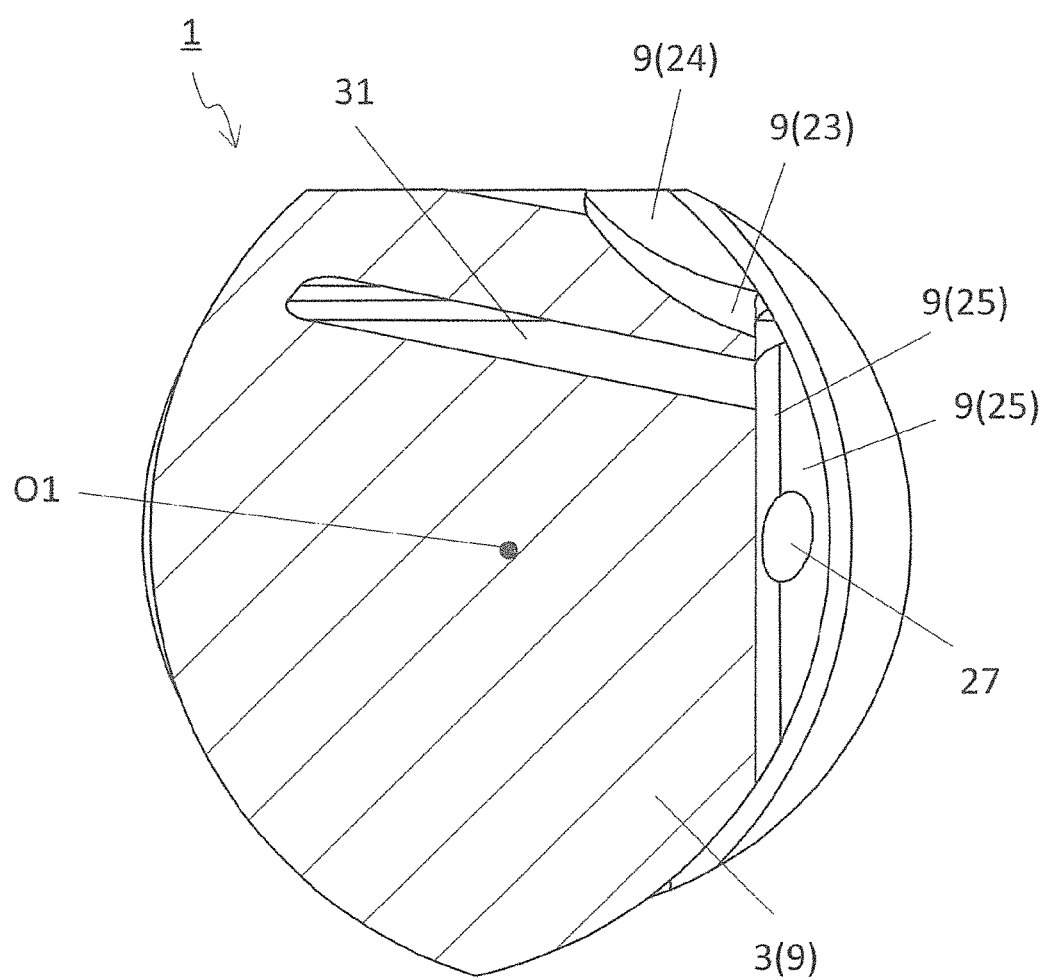
FIG. 10 is a cross-sectional view of the cutting tool shown in FIG. 5 taken along a cross section C3.
Figure 11:
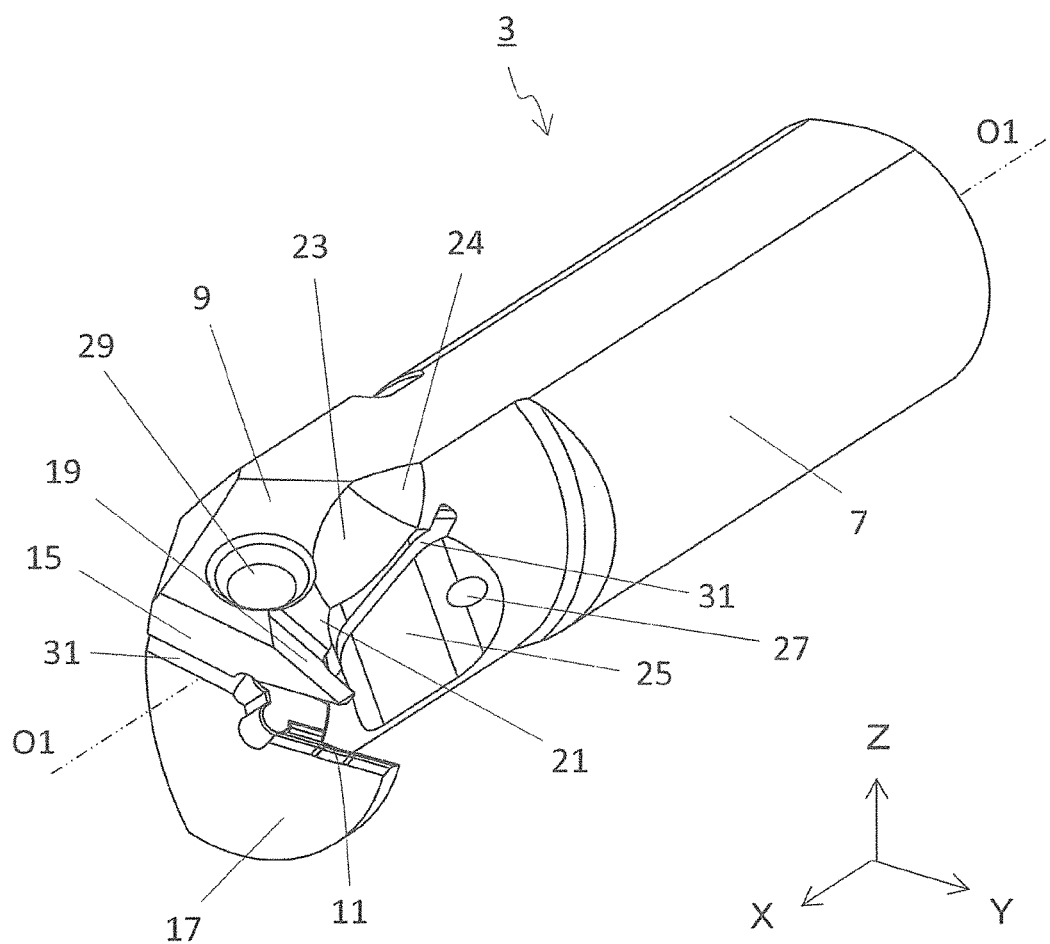
FIG. 11 is a perspective view showing a holder of the cutting tool shown in FIG. 1.
Figure 12:
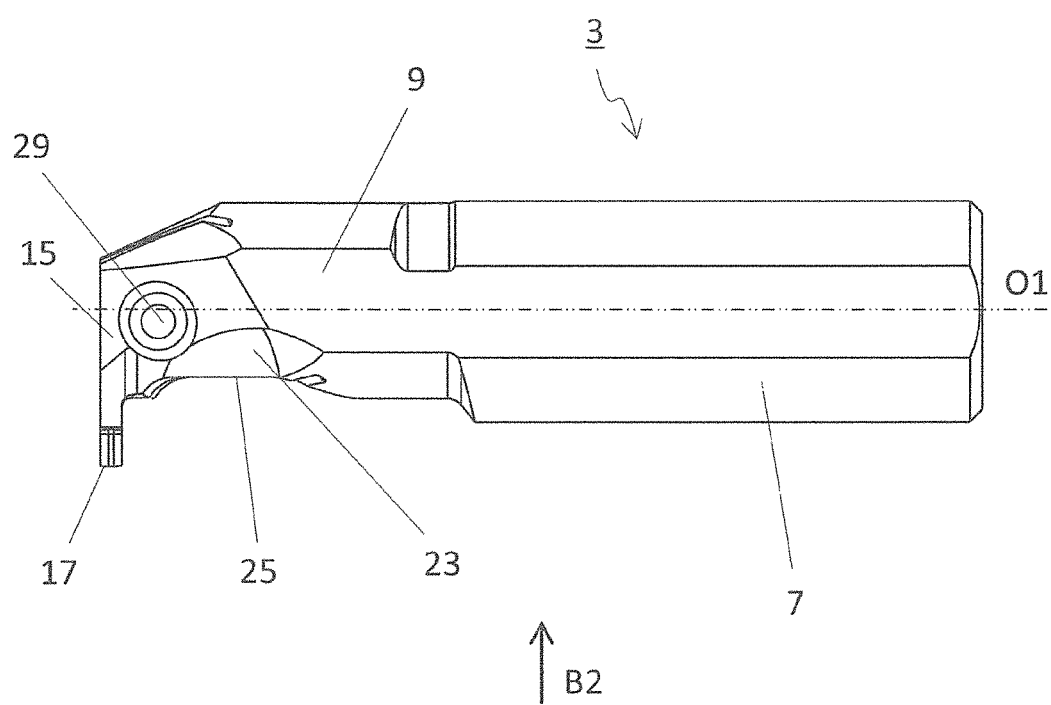
FIG. 12 is a top plan view of the holder shown in FIG. 11.
Figure 13:
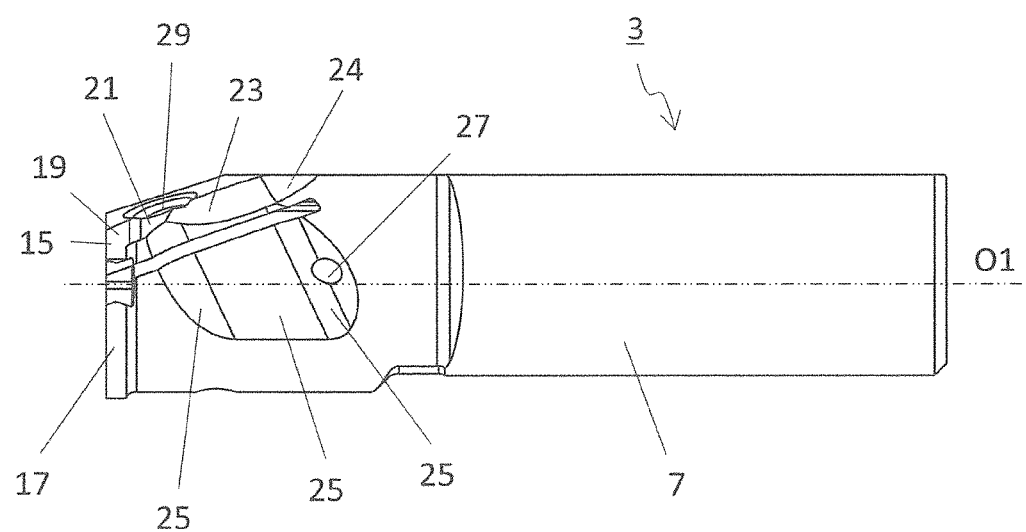
FIG. 13 is a side view of the holder shown in FIG. 12 as viewed from a side in a direction B2.

One side surface side from which the cutting edge 13 projects forms a lower side in FIG. 3, and forms a right side in FIG. 9 and FIG. 10. On the other hand, the other surface side which is located at a side opposite to the side from which the cutting edge 13 projects forms an upper side in FIG. 3, and forms a left side in FIG. 9 and FIG. 10. Accordingly, the cutting edge 13 is located at a lower side of the holder 3 in FIG. 3, and is located at a right side of the holder 3 in FIG. 9.

The head portion 9 of the holder 3 in this embodiment includes the above-mentioned pocket 11, an upper jaw portion 15, a lower jaw portion 17, a first wall surface 19, a second wall surface 21, a third wall surface 23, a fourth wall surface 24, a fifth wall surface 25, an opening 27, and a screw hole 29. The head portion 9 includes a slit 31 which extends toward a rear end side from a front end. The pocket 11 forms a part of the slit 31. That is, a part of the slit 31 located at a front end side functions as the pocket 11. The part of the slit 31 located at the front end side is located such that the part of the slit 31 includes the first central axis O1 as viewed from the front end side.

The upper jaw portion 15 and the lower jaw portion 17 are located at the front end side of the head portion 9, and opposedly face each other with the slit 31 interposed therebetween. As shown in FIG. 9, the upper jaw portion 15 is located above the insert 5, and the lower jaw portion 17 is located below the insert 5. In this embodiment, the direction orthogonal to the first central axis O1 and the second central axis O2 is assumed as the vertical direction. That is, assuming the first central axis O1 as an x axis and the second central axis O2 as a y axis in an orthogonal xyz coordinate system, a z axis direction becomes the vertical direction. An upper side in FIG. 1 is an upper side in the above-mentioned vertical direction, and a lower side in FIG. 1 is a lower side in the above-mentioned vertical direction.

The pocket 11 is located between the upper jaw portion 15 and the lower jaw portion 17. The insert 5 has a rod shape which extends in the direction along the second central axis O2 and hence, the pocket 11, the upper jaw portion 15 and the lower jaw portion 17 also extend in the direction along the second central axis O2.

In other words, the head portion 9 includes the upper jaw portion 15 and the lower jaw portion 17 which opposedly face each other with the slit 31 which extends toward the rear end side from the front end interposed therebetween. A part of the slit 31 on a front end side functions as the pocket 11, and the insert 5 is mounted in the pocket 11.

The first wall surface 19 is a part of an upper surface of the upper jaw portion 15, and is located above the pocket 11. The first wall surface 19 is a flat surface region located on the upper surface of the upper jaw portion 15, and extends toward the other side surface side from an end portion on one side surface side in the direction along the second central axis O2. The first wall surface 19 is inclined upward as the first wall surface 19 extends away from the cutting edge 13. Accordingly, the first wall surface 19 is inclined upward as the first wall surface 19 extends toward the other side surface side from one side surface side. For example, as shown in FIG. 9, the first wall surface 19 is inclined upward as the first wall surface 19 extends toward a left side which forms the other side surface side from a right side which forms one side surface side.

An inclination angle of the first wall surface 19 with respect to the second central axis O2 which is indicated by θ1 in FIG. 9 is set to approximately 10 to 50°. As shown in FIG. 9, the upper surface and the lower surface of the insert 5 extend parallel to the second central axis O2. Accordingly, to consider this structure from a holder 3 side, an angle which the first wall surface 19 makes with respect to a surface (a lower surface of the upper jaw portion 15) which is brought into contact with the upper surface or the lower surface of the insert 5 is set as θ1.

Chips cut by the cutting edge 13 of the insert 5 pass over the upper surface of the insert 5 and, then, pass over the upper surface of the upper jaw portion 15. At this stage of operation, the above-mentioned inclined first wall surface 19 is located on the upper surface of the upper jaw portion 15 and hence, it is possible to enlarge a space through which chips flow in an advancing manner toward the other side surface side from one side surface side with certainty.

The chips generated by the cutting edge 13 advances toward the other side surface side from one side surface side. At this stage of operation, the first wall surface 19 is inclined upward as the first wall surface 19 extends away from the cutting edge 13. Accordingly, it is possible to make the advancing direction of chips directed upward when the chips pass over the first wall surface 19.

Figure 7:
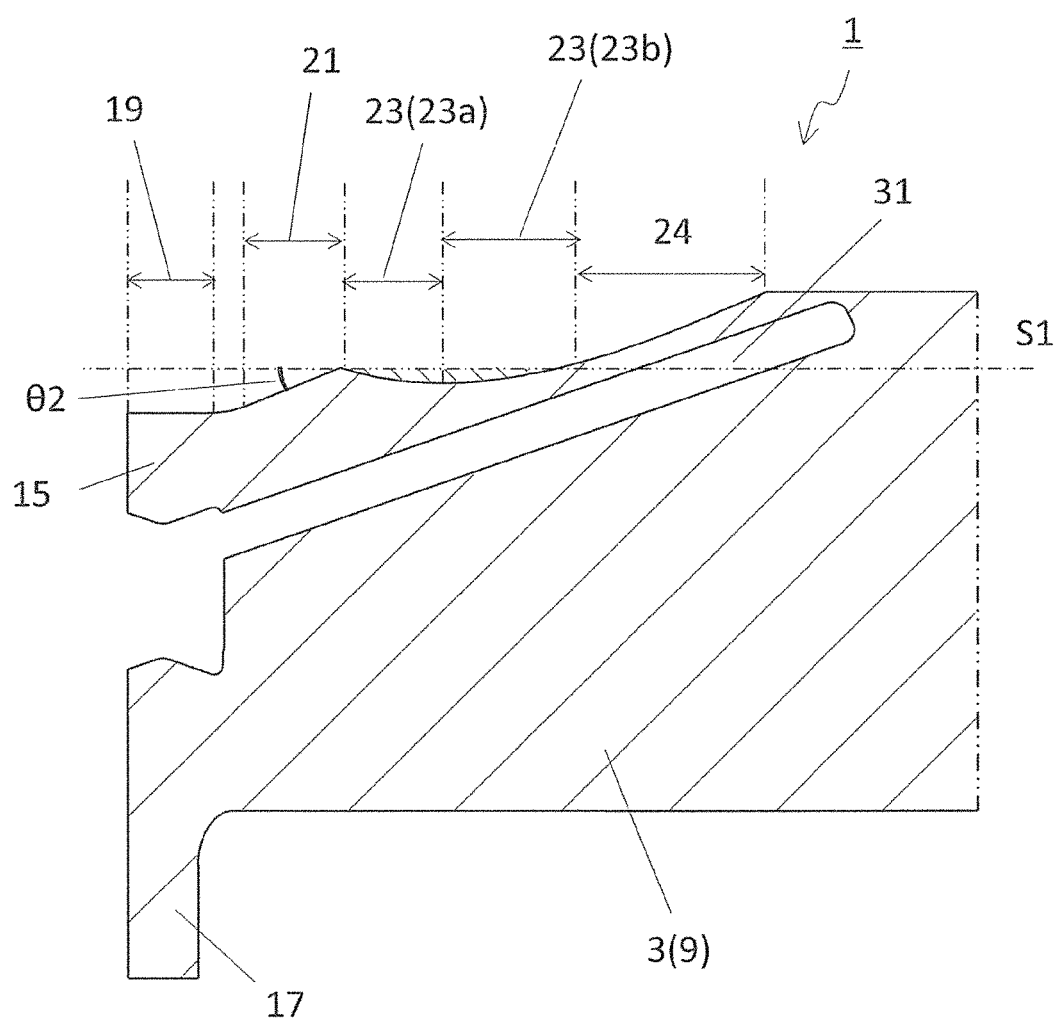
FIG. 7 is a cross-sectional view of the cutting tool shown in FIG. 3 taken along a cross section C1.

The second wall surface 21 is located at one side surface side and closer to a rear end side of the holder 3 than the first wall surface 19 is. As shown in FIG. 7, the second wall surface 21 is inclined upward as the second wall surface 21 extends toward the rear end side of the holder 3. As shown in FIG. 9, the second wall surface 21 is, in the same manner as the first wall surface 19, inclined upward as the second wall surface 21 extends toward the other side surface side from one side surface side. An inclination angle of the second wall surface 21 with respect to the first central axis O1 is set to approximately 10 to 50°. The inclination angle of the second wall surface 21 with respect to the first central axis O1 is indicated as an angle θ2 which is made with respect to a virtual straight line S1 which is parallel to the first central axis O1 in FIG. 7.

Figure 8:
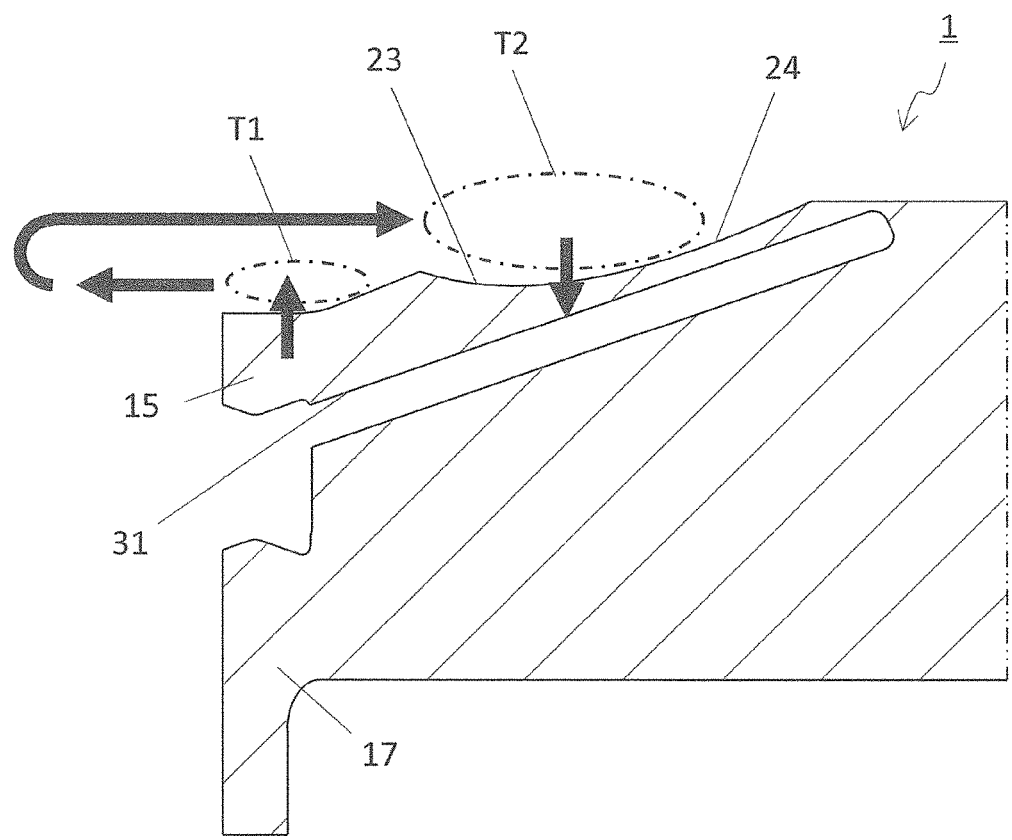
FIG. 8 is a view equal to the cross-sectional view shown in FIG. 7, and is also a schematic view which shows a flow of chips.

The second wall surface 21 is inclined upward as the second wall surface 21 extends toward the rear end side of the holder 3 and hence, as shown in FIG. 8, a space T1 is located above the first wall surface and the second wall surface. Accordingly, it is possible to enlarge a space through which chips flow in an advancing manner toward the other side surface side from one side surface side with certainty.

In such a cutting operation, the first wall surface 19 of the cutting tool 1 of this embodiment is parallel to the cutting edge 13 of the insert 5. Accordingly, it is possible to make chips which flow on the first wall surface 19 advance to the space T1 in a stable manner. A state where the first wall surface 19 is parallel to the cutting edge 13 is not limited to a state where the first wall surface 19 is strictly parallel to the cutting edge 13 or the first wall surface 19 is strictly parallel to the first center O1. The first wall surface 19 may have a slight inclination of approximately 5° with respect to the first central axis O1. When the cutting edge 13 does not have a straight-line shape, it is sufficient to evaluate whether or not the first wall surface 19 is parallel to the cutting edge 13 based on an inclination of the first wall surface 19 with respect to a virtual straight line which connects both ends of the cutting edge 13.

Also in the case where a cooling liquid (coolant) is used for cooling the cutting edge 13, a smooth flow of chips can be realized due to the formation of the second wall surface as in the case of this embodiment. To be more specific, when an inner peripheral surface of a circular cylindrical workpiece is cut by the cutting edge 13, chips once advance toward the other side surface side from one side surface side.

Thereafter, the chips are once made to flow toward the front end side from the holder 3 together with a coolant injected from the opening 27. The chips which are made to flow toward the front end side from the holder 3 bounce on a bottom surface on an inner surface of a workpiece located closer to the front end side than the holder is, for example. Then, the chips advance toward the rear end side from the front end side of the holder 3 together with the coolant, and are discharged to the outside. At this stage of operation, the flow of chips advancing toward the front end side of the holder 3 and the flow of chips advancing toward the rear end side of the holder 3 impinge on each other so that there is a possibility that the flow of chips stagnates.

In the holder 3 in this embodiment, the second wall surface 21 is inclined so that the space T1 is formed. Accordingly, chips firstly advance toward the other side surface side from the cutting edge 13, and flow into the space T1. The chips flown into the space T1 are, together with a cooling liquid, flown to the front end side which is a side opposite to the rear end side where the second wall surface 21 is located with reference to the space T1. Thereafter, the chips advance toward the rear end side from the front end side of the holder 3.

The head portion 9 in this embodiment includes the third wall surface 23 and the fourth wall surface 24 which are located at one side surface side and closer to the rear end side of the holder 3 than the second wall surface 21 is. The third wall surface 23 is located closer to the rear end side than the second wall surface 21 is, and has a concave shape which extends toward the rear end side of the holder 3 from the second wall surface 21. The fourth wall surface 24 is located closer to the rear end side than the third wall surface 23 is, and has a shape which is inclined upward as the fourth wall surface 24 extends away from the third wall surface 23.

The third wall surface 23 has a shape which is concave downward from an upper end of the second wall surface 21. In this embodiment, the third wall surface 23 is located below the upper end of the second wall surface 21. To be more specific, as shown in FIG. 7, in a cross section which is orthogonal to the second central axis O2 extending toward the other side surface side from one side surface side, the third wall surface 23 is located as described below.

In a cross section shown in FIG. 7, the virtual straight line S1 which passes over the upper end of the second wall surface 21 and is parallel to the first central axis O1 is set. In this case, the third wall surface 23 is located below the straight line S1. For example, a region of the third wall surface 23 which is located below the virtual straight line S1 is indicated by hatching extending toward the right lower side from the left upper side in FIG. 7.

Chips which flow toward the rear end side of the holder 3 firstly pass over the space T1 and, then, flow into the space T2 located above the third wall surface 23. In this manner, a smooth flow of chips can be formed.

When a difference between an outer diameter of the holder 3 and an inner diameter of a workpiece is small, at a stage of starting a cutting process, a space located between the other side surface side of the holder 3 and the workpiece and a space located between an upper side of the holder 3 and the workpiece are respectively small. Accordingly, a space for discharging chips toward the rear end side of the holder 3 is not ensured sufficiently so that there is a possibility that chips are not sufficiently discharged.

According to the holder 3 of this embodiment, however, the third wall surface 23 is concave downward from the upper end of the second wall surface 21. Further, the fourth wall surface 24 is located above the upper end of the second wall surface 21. Accordingly, chips flown into the space T2 advance toward a lower jaw portion 17 side and, at the same time, advance toward a viewer's side viewing FIG. 8, in other words, advance toward a lower side in FIG. 4.

With such a flow of chips, it is possible to avoid a state where chips advance to a narrow space between the upper side of the holder 3 and a workpiece so that the space is clogged by the chips. At the same time, chips can be discharged to the outside of the holder 3 in a stable manner. As described above, according to the holder 3 of this embodiment, a space which allows a flow of chips is ensured and hence, the chips can be discharged to the outside in a stable manner.

Further, the fourth wall surface 24 has a shape which is inclined upward as the fourth wall surface 24 extends away from the third wall surface 23 and hence, it is possible to increase an outer diameter of a portion of the holder 3 which is located closer to the rear end side than the fourth wall surface 24 is. Accordingly, it is also possible to increase rigidity of the holder.

In this embodiment, in a cross section orthogonal to a virtual straight line which extends toward the other side surface side from one side surface side, that is, in a cross section orthogonal to the second central axis O2, the third wall surface 23 is located above the first wall surface 19. Although the slit 31 extends below the third wall surface 23 as shown in FIG. 7, the third wall surface 23 has the above-mentioned configuration and hence, a portion of the head portion 9 which is located below the slit 31 can have a large wall thickness and hence, durability of the holder 3 can be further increased.

In this embodiment, the second wall surface 21 has a flat surface shape. As shown in FIG. 7, the slit 31 extends below the second wall surface 21. Accordingly, compared to a case where the second wall surface 21 has a concave curved surface shape, the holder 3 can ensure larger wall thickness between the second wall surface 21 and the slit 31 and hence, durability of the holder 3 can be increased. Further, compared to a case where the second wall surface 21 has a convex curved surface shape, the holder 3 can ensure the large space T1.

The third wall surface 23 in this embodiment has a concave curved surface shape. By forming the third wall surface 23 into a curved surface shape in this manner, chips can easily flow over the third wall surface 23 in a stable manner. Further, the third wall surface 23 has a curved surface shape and hence, the holder 3 can ensure the large space T2.

In this embodiment, in a side view of the holder 3 shown in FIG. 6 or in a cross-sectional view of the holder 3 shown in FIG. 7, the third wall surface 23, an end portion of the third wall surface 23 on a front end side (an end portion on the left side in FIG. 7) is located below an end portion of the third wall surface 23 on a rear end side (an end portion on the right side in FIG. 7). Further, as shown in FIG. 10, the third wall surface 23 is inclined downward as the third wall surface 23 extends toward one side surface side from the other side surface side. To be more specific, in a cross-sectional view of the holder 3, an end portion of the third wall surface 23 on one side surface side (an end portion on the right side in FIG. 10) is located below an end portion of the third wall surface 23 on the other side surface side (an end portion on the left side in FIG. 10).

In the cross-sectional view of the holder 3, the end portion of the third wall surface 23 on one side surface side is located below the end portion of the third wall surface 23 on the other side surface side and hence, chips easily flow toward one side surface side. In a stage of starting cutting of a workpiece, a space is ensured between one sidesurface side and a workpiece at a portion of the holder 3 which is located more at the rear end side than a portion of the holder 3 in which the insert 5 is mounted. Accordingly, in this stage, it is possible to make chips flow between one side surface side of the portion of the holder 3 located at the rear end side and the workpiece.

The third wall surface 23 includes a first region 23a located at the front end side and a second region 23b located at the rear end side. The first region 23a is inclined downward as the first region 23a extends toward the rear end side of the holder 3 from the second wall surface 21. The second region 23b is inclined upward as the second region 23b extends toward the rear end side of the holder 3 from the first region 23a. The third wall surface 23 includes the first region 23a and hence, the large space T2 can be ensured. Further, at a stage where a cutting process has been advanced, a space can be easily ensured above the holder 3. In such a stage, the third wall surface 23 includes the second region 23b and hence, chips can be easily made to flow toward the upper surface side of the holder 3.

As has been described heretofore, corresponding to stages of the cutting process, chips can be discharged in a direction that the chips can be easily discharged. Accordingly, chips can be discharged to the outside in a stable manner in a wide range from the stage where the cutting process starts to the stage where the cutting process is finished.

In this embodiment, the third wall surface 23 is configured such that an end portion of the third wall surface 23 located at the rear end side of the holder 3 has a larger height from a lower surface of the holder 3 than an end portion of the third wall surface 23 located at the front end side of the holder 3. With such a configuration, it is possible to control an advancing direction of chips which have advanced to the space T2 by the third wall surface 23 in a stable manner.

As shown in FIG. 7, the slit 31 extends below the third wall surface 23. However, the third wall surface 23 has the above-mentioned configuration and hence, the slit 31 can be formed such that the slit 31 is inclined upward as the slit 31 extends toward the rear end side of the holder 3 from the front end side of the holder 3. Accordingly, it is possible to further increase the wall thickness of the portion of the head portion 9 located below the slit 31 and hence, durability of the holder 3 can be further increased.

In this embodiment, the third wall surface 23 has a concave curved surface shape, and includes the first region 23a and the second region 23b. In this case, in a cross section orthogonal to a virtual straight line which extends toward the other side surface side from one side surface side, that is, in a cross section orthogonal to the second central axis, a curvature of the first region 23a is larger than a curvature of the second region 23b. With such a configuration, it is possible to further increase the wall thickness of the portion of the head portion 9 located below the slit 31.

In this embodiment, the head portion 9 also includes a concave-shaped fifth wall surface 25 which is located at one side surface side and closer to the rear end side than the pocket 11, and extends downward from the third wall surface 23. In the case where the head portion 9 includes such a fifth wall surface 25, it is possible to make chips which flow toward one side surface side on the third wall surface 23 flow into a space located over the fifth wall surface 25. Accordingly, even when the cutting process advances so that a space between one side surface side of the holder 3 and a workpiece becomes narrow, chips can be also discharged to the lower surface side of the holder 3 by passing over the fifth wall surface 25. Accordingly, chips can be discharged to the outside in a more stable manner.

A through hole through which a cooling liquid flows is located inside the holder 3, and a front end side of the through hole is opened on the fifth wall surface 25. The position of the opening 27 of the through hole on the front end side is not particularly limited to the fifth wall surface 25. During a cutting process, a cooling liquid is injected from the opening 27 located in the front end side. Although the cooling liquid is mainly used for cooling the cutting edge 13 and a workpiece, the cooling liquid also plays a role of making chips flow toward the rear end side of the holder 3.

As a cooling liquid, for example, a water-insoluble oil or a water-soluble oil is selectively used as desired corresponding to a material for forming a workpiece. As a water-insoluble oil, for example, an oil such as an oily oil, a non-active extreme pressure oil or an active extreme pressure oil can be named. As a water-soluble oil, an oil such as an emulsion, a soluble oil or a solution can be named.

In this embodiment, the head portion 9 includes the screw hole 29. The screw hole 29 is located closer to the rear end side than the pocket 11, and extends to the lower jaw portion 17 from the upper jaw portion 15. A fixing screw 33 is mounted in the screw hole 29. By fastening the fixing screw 33, the upper jaw portion 15 and the lower jaw portion 17 are made to approach to each other so that the insert 5 is fastened by the upper jaw portion 15 and the lower jaw portion 17. With such fastening, the insert 5 is fixed to the holder 3.

In the cutting insert 5 in this embodiment, the insert 5 is fixed to the holder 3 by the fixing screw 33. However, the fixing of the insert 5 is not limited to such a mode. For example, the insert 5 can be fixed to the holder 3 using a well-known clamp structure without causing any problem.

As described above, in this embodiment, the holder 3 has a rod shape and includes the shank portion 7 located at the rear end side, and the head portion 9 located closer to the front end side than the shank portion 7, the insert 5 including the cutting edge 13 being mounted on the head portion 9.

The head portion 9 includes: the upper jaw portion 15 and the lower jaw portion 17 located at a front end and facing each other in an opposed manner; the pocket 11 located between the upper jaw portion 15 and the lower jaw portion 17, the insert 5 being mounted in the pocket 11 in such a manner that the cutting edge 13 projects from one side surface side in a direction orthogonal to the first central axis O1; the first wall surface 19 extending toward the other side surface side from the end portion of one side surface side on the upper surface of the upper jaw portion 15, the first wall surface 19 inclined upward as the first wall surface 19 extends toward the other side surface side; the second wall surface 21 located closer to the rear end side than the first wall surface 19 and located at one side surface side, the second wall surface 21 inclined upward as the second wall surface 21 extends toward the rear end side of the holder 3; the concave-shaped third wall surface 23 located closer to the rear end side than the second wall surface 21; and the fourth wall surface 24 located closer to the rear end side of the holder 3 than the third wall surface 23, the fourth wall surface 24 inclined upward as the fourth wall surface 24 extends away from the third wall surface 23. The third wall surface 23 is concave downward from the upper end of the second wall surface 21, and the fourth wall surface 24 is located above the upper end of the second wall surface 21.

The cutting tool 1 of this embodiment includes: the holder 3 described in the above-mentioned embodiment; and the insert 5 mounted in the pocket 11 and including the cutting edge 13. Accordingly, chips can be discharged to the outside in a stable manner in the cutting process.

Next, a method of producing a machined product according to an embodiment of the present invention is described with reference to drawings.

A machined product is produced by applying a cutting process to a workpiece 101. The method of producing a machined product according to this embodiment includes the following steps. That is, the method of producing a machined product according to this embodiment includes:

(1) rotating the workpiece 101;
(2) bringing the cutting edge 13 of the cutting tool 1 described in the above-mentioned embodiment into contact with the workpiece 101 being rotated; and
(3) separating the cutting tool 1 from the workpiece 101.

Figure 14:
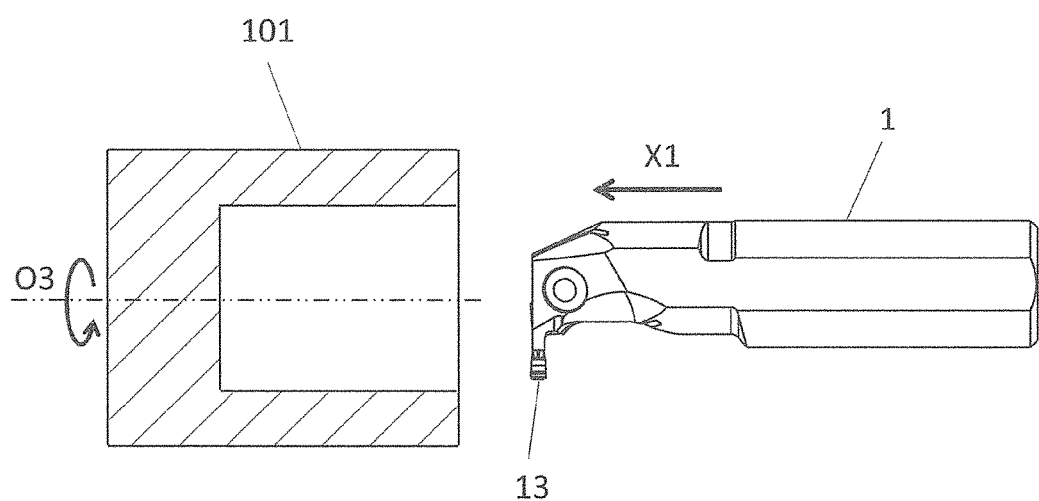
FIG. 14 is a schematic view showing a step of a method of producing a machined product according to an embodiment.
Figure 15:
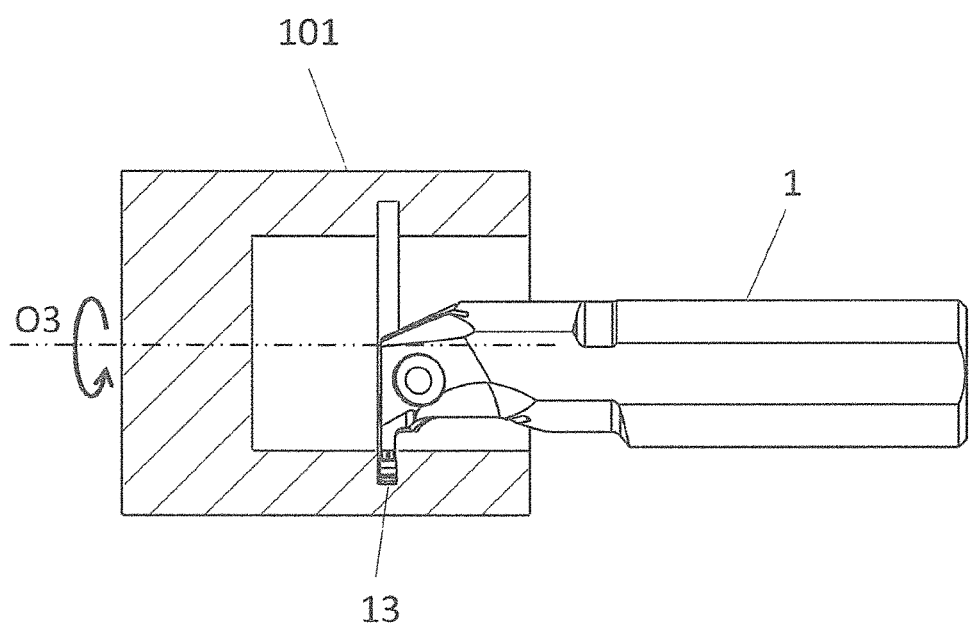
FIG. 15 is a schematic view showing a step of the method of producing a machined product according to an embodiment.
Figure 16:
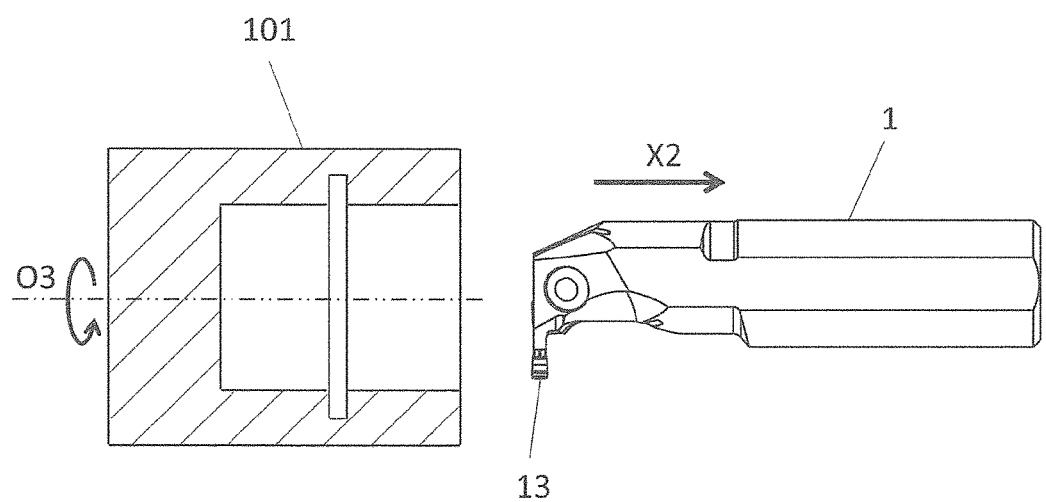
FIG. 16 is a schematic view showing still a step of the method of producing a machined product according to an embodiment.

To be more specific, first, as shown in FIG. 14, the workpiece 101 is rotated about an axis O3 and, at the same time, the cutting tool 1 is made to approach the workpiece 101 in relative relationship therebetween. Next, as shown in FIG. 15, the cutting edge 13 of the cutting tool 1 is brought into contact with the rotating workpiece 101 thus cutting the workpiece 101. Then, as shown in FIG. 16, the cutting tool 1 is moved away from the workpiece 101 in relative relationship therebetween.

In this embodiment, the cutting tool 1 is made to approach to the workpiece 101 by moving the cutting tool 1 in the X1 direction in a state where the axis O3 is fixed and the workpiece 101 is rotated. In FIG. 15, the workpiece 101 is cut by bringing the cutting edge 13 of the insert into contact with the rotating workpiece 101. In FIG. 16, the cutting tool 1 is moved away from the workpiece 101 by moving the cutting tool 1 in the X2 direction in a state where the workpiece 101 is being rotated.

In a cutting process of the manufacturing method of this embodiment, in respective steps, the cutting tool 1 is brought into contact with the workpiece 101 or the cutting tool 1 is moved away from the workpiece 101 by moving the cutting tool 1. However, as a matter of course, the manner of bringing the cutting tool 1 into contact with the workpiece 101 and the manner of moving the cutting tool 1 away from the workpiece 101 are not limited to such a mode.

For example, in the step (1), the workpiece 101 may be made to approach to the cutting tool 1. In the same manner, in the step (3), the workpiece 101 may be moved away from the cutting tool 1. To continue the cutting process, it is sufficient to repeat a step of bringing the cutting edge 13 of the insert into contact with different portions of the workpiece 101 while maintaining the workpiece 101 in a rotating state.

Typical examples of the material of the workpiece 101 include carbon steel, alloy steel, stainless steel, cast iron, nonferrous metal and the like.

DESCRIPTION OF THE REFERENCE NUMERAL

1: Cutting tool
3: Holder
5: Cutting insert (insert)
7: Shank portion
9: Head portion
11: Insert pocket (pocket)
13: Cutting edge
15: Upper jaw portion
17: Lower jaw portion
19: First wall surface
21: Second wall surface
23: Third wall surface
23*a*: First region
23*b*: Second region
24: Fourth wall surface
25: Fifth wall surface
27: Opening
29: Screw hole
31: Slit
33: Fixing screw
101: Workpiece

The invention claimed is:

1. A holder, having a rod shape and comprising:
a shank portion located at a rear end of the holder opposite a front end of the holder; and
a head portion located closer to the front end of the holder than the shank portion, wherein
the head portion comprises:
an upper jaw portion and a lower jaw portion located at the front end and facing each other in an opposed manner;
an insert pocket located between the upper jaw portion and the lower jaw portion, the insert pocket configured such that a cutting edge of a cutting insert being mounted in the insert pocket projects from a first side surface of the holder in a direction orthogonal to a central axis;
a first wall surface extending toward a second side surface of the holder, opposite the first side surface, from an end portion of the first side surface on an upper surface of the upper jaw portion, the first wall surface inclined upward as the first wall surface extends toward the second side surface;
a second wall surface located closer to the rear end than the first wall surface and located at the first side surface, the second wall surface inclined upward as the second wall surface extends toward the rear end;
a third wall surface located closer to the rear end than the second wall surface and having a concave shape; and
a fourth wall surface located closer to the rear end than the third wall surface, the fourth wall surface inclined upward as the fourth wall surface extends away from the third wall surface, and
the third wall surface is concave downward from an upper end of the second wall surface, and the fourth wall surface is located above the upper end of the second wall surface.

2. The holder according to claim 1, wherein the third wall surface is located above the first wall surface in a cross section orthogonal to a virtual straight line which extends toward the second side surface from the first side surface.

3. The holder according to claim 1, wherein the second wall surface has a flat surface shape.

4. The holder according to claim 1, wherein the third wall surface has a concave curved surface shape.

5. The holder according to claim 4, wherein the third wall surface comprises a first region inclined downward as the first region extends toward the rear end of the holder from the second wall surface, and a second region inclined upward as the second region extends toward the rear end of the holder from the first region, and
a curvature of the first region is larger than a curvature of the second region in a cross section orthogonal to a virtual straight line which extends toward the second side surface from the first side surface.

6. The holder according to claim 1, wherein the third wall surface is inclined downward as the third wall surface extends toward the first side surface from the second side surface.

7. The holder according to claim 1, wherein the head portion further comprises a fifth wall surface which is located at the first side surface and closer to the rear end than the insert pocket, has a concave shape and extends downward from the third wall surface.

8. A cutting tool, comprising:
a holder having a rod shape, a rear end and a front end opposite the rear end, the holder comprising:
a shank portion located at the rear end of the holder; and
a head portion located closer to the front end than the shank portion; and
a cutting insert comprising a cutting edge,
wherein the head portion comprises:
an upper jaw portion and a lower jaw portion located at the front end and facing each other in an opposed manner;
an insert pocket located between the upper jaw portion and the lower jaw portion, the cutting insert being mounted in the insert pocket such that the cutting edge of the cutting insert projects from a first side surface of the holder in a direction orthogonal to a central axis;
a first wall surface extending toward a second side surface of the holder, opposite the first side surface, from an end portion of the first side surface on an upper surface of the upper jaw portion, the first wall surface inclined upward as the first wall surface extends toward the second side surface;
a second wall surface located closer to the rear end than the first wall surface and located at the first side surface, the second wall surface inclined upward as the second wall surface extends toward the rear end;
a third wall surface located closer to the rear end than the second wall surface and having a concave shape; and
a fourth wall surface located closer to the rear end than the third wall surface, the fourth wall surface inclined upward as the fourth wall surface extends away from the third wall surface, and the third wall surface is concave downward from an upper end of the second wall surface, and the fourth wall surface is located above the upper end of the second wall surface.

9. The cutting tool according to claim 8, wherein the first wall surface is parallel to the cutting edge.

10. A method of producing a machined product, comprising:
- rotating a workpiece;
- bringing the cutting edge of the cutting tool according to claim 8 into contact with the workpiece being rotated; and
- separating the cutting tool from the workpiece.

\* \* \* \* \*